Oct. 24, 1967 K. D. RICHMOND 3,348,422
TRANSMISSION BELT AND METHOD OF MANUFACTURE
Filed July 22, 1965 2 Sheets-Sheet 1
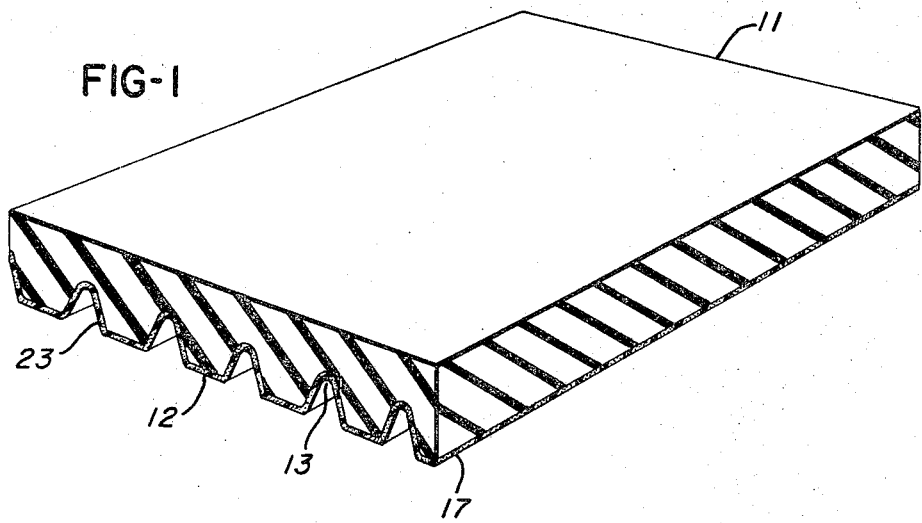
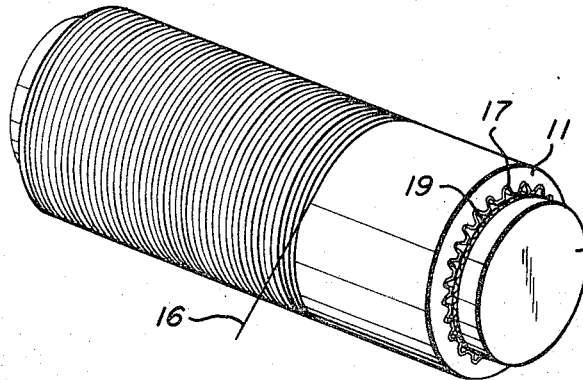
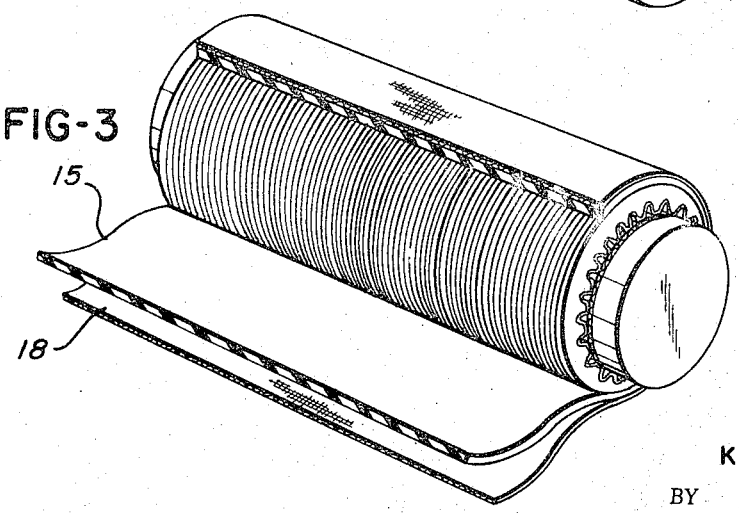
INVENTOR.
KENNETH D. RICHMOND
BY
Reuben Wolk
ATTORNEY Oct. 24, 1967 K. D. RICHMOND 3,348,422
TRANSMISSION BELT AND METHOD OF MANUFACTURE
Filed July 22, 1965 2 Sheets-Sheet 2
FIG-8
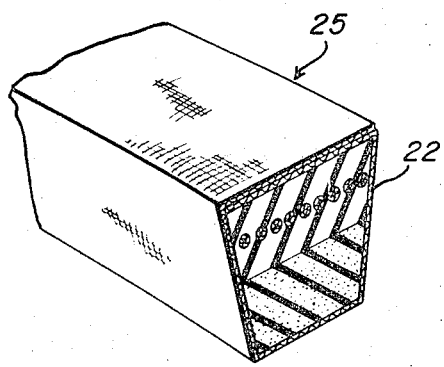
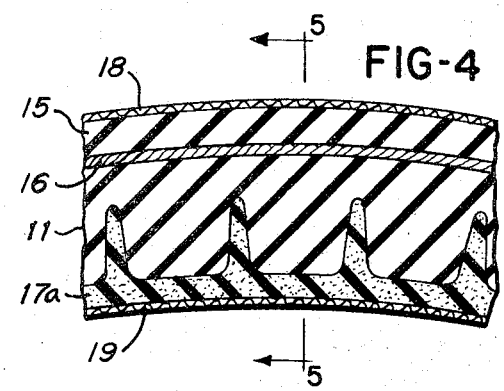
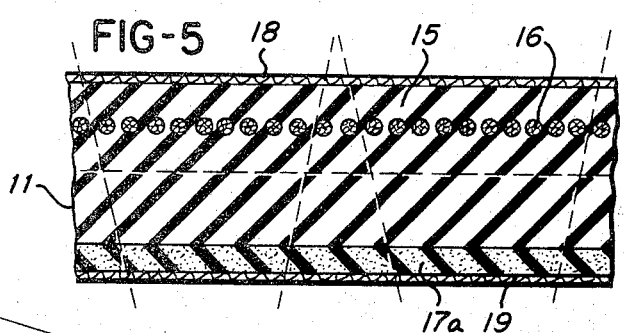
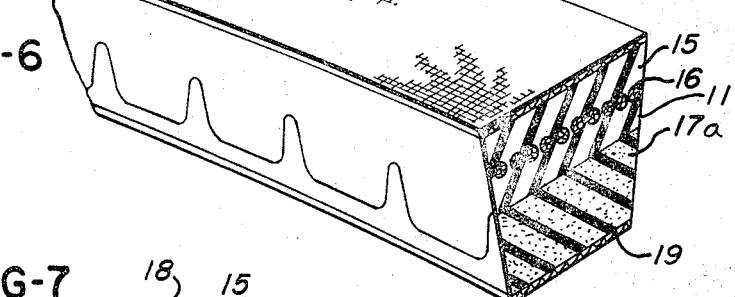
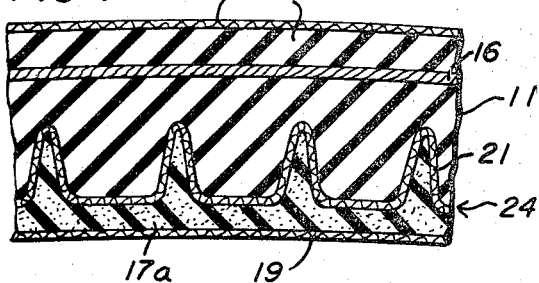
INVENTOR.
KENNETH D. RICHMOND
BY
Reuben Wolk
ATTORNEY

United States Patent Office 3,348,422
Patented Oct. 24, 1967

3,348,422
TRANSMISSION BELT AND METHOD OF MANUFACTURE
Kenneth D. Richmond, Nixa, Mo., assignor to Dayco Corporation, Dayton, Ohio, a corporation of Ohio
Filed July 22, 1965, Ser. No. 474,059
5 Claims. (Cl. 74—233)

This invention relates to a transmission belt and method of manufacture, and particularly to the type of belt having a trapezoidal cross section and referred to as a V-belt.

One type of transmission belt which has wide application is a toothed belt which provides improved flexibility in a drive system. The present invention relates to an improved version of a belt of this type. One of the objections to a toothed belt is that of noise which is created by the motion of air through the grooves between the teeth. The present invention will overcome this problem, while at the same time maintaining the flexibility of the toothed belt. In addition, certain types of toothed belts have a tendency to crack as the belt passes around the pulley, and the present improved belt will also eliminate this problem. Thirdly, it is very difficult to completely wrap a toothed belt because of its shape, and for this reason premolded toothed belts are presently not available on the market with a fabric wrap around the complete outer, inner and lateral driving surfaces.

All the above difficulties are overcome by utilizing a toothed belt in which an inner section of blown rubber is incorporated, this section providing a spongy crack-resistant section which remains as a permanent part of the belt. Because of the softness of this section it permits nearly as much flexibility of the inner portion of the belt as if there were no such section. While it has been known in the art to provide fillers between teeth in belts of this type, such as described in United States Patent No. 2,062,568, these fillers were not formed of blown rubber which was formed during the curing operation, but merely consisted of a conventional rubber compound.

It is therefore a principal object of the present invention to provide a toothed belt having soft sections between the teeth.

It is a further object to provide a simple method of fabricating this section.

These and other objects will be readily apparent from the following description, in which:

FIGURE 1 is a perspective view in partial cross section illustrating a first step in fabricating a typical belt.

FIGURES 2 and 3 are perspective views illustrating further steps in fabricating the belt.

FIGURE 4 is a sectional view of a completed belt body.

FIGURE 5 is a cross section taken along lines 5—5 of FIGURE 4.

FIGURE 6 is a perspective view illustrating the completed belt.

FIGURE 7 is a sectional view similar to FIGURE 4 illustrating a modification of the invention.

FIGURE 8 is a perspective view similar to FIGURE 6 illustrating another modification of the present invention.

Referring now to the drawings, a first step of the invention is illustrated in FIGURE 1. The material 11, which forms the compression section of the belt, has been prefabricated into a section having the form of teeth 12 alternating with the internally extending grooves 13, the teeth and grooves being of any desired spacing and dimension in accordance with the finished product. Along the toothed and grooved face of this material is laid a thin layer of rubber stock 17 into which has been milled a blowing agent 23 which is capable of expanding under heat and causing the material 17 to become spongy and soft. This blowing agent may be any suitable material such as ammonium bicarbonate, ammonium carbonate, sodium bicarbonate, sodium carbonate, or diazoaminobenzene. The layer of material 17 may be secured to the face of the material 11 by the use of adhesive or simply by painting the mating surfaces with a solvent which will cause the rubber to flow sufficiently to create an adherence between the two faces.

The next step of the invention is shown in FIGURE 2 in which a fabric layer 19 is wrapped around the mandrel. This layer consists of a bias-woven fabric of cotton, rayon, nylon, or the like, which is impregnated or coated with rubber. Upon the fabric layer are placed the assembled materials 11 and 17 which are wrapped around the fabric and building mandrel 14 in such a manner that the face having the teeth and grooves is inward as shown, with the teeth and grooves extending longitudinally of the mandrel. A strength cord 16 is spun over the outside of the material 11 in a well-known manner to form a continuous helical cord along the outer surface of the assembly. Following this step the assembly of the belt body is completed as shown in FIGURE 3 by wrapping the cord layer with an outer rubber layer 15 which comprises the tension section, and surmounting this by an outer fabric layer 18. The entire assembly now consists of the inner fabric layer 19, the blow stock material 17, the compression section 11, strength cord 16, the tension section 15, and the outer fabric layer 18. This assembly is then cross wrapped in a well-known manner by wrapping fabric tape around the entire exterior of the assembly in order to maintain all the components in the desired relationship. The assembly is then cured in an oven such as used for conventional belt curing processes. It should be noted that before curing, the blow stock 17 and compression section 11 maintain the corrugated shape so that there is no material between the grooves 13 and the mandrel; this represents a considerable departure from the prior art as conventional toothed belts require the use of a preformed matrix to be placed on the mandrel in order to preserve the shape of the teeth and grooves.

During the curing process the heat causes the blowing agent to expand the entire section 17 so that it forms a homogeneous body that fills the gaps between the section 11 and the inner fabric layer 19. The resulting blown rubber member 17a is in the form of a sponge rubber member which fills the original grooves 13 between the teeth 12 as well as forming additional blown material inward of the teeth, as shown in FIGURES 4–6. The resultant belt body is one having a cohesive tension and compression section and strength cord as is conventionally fabricated; however, in this instance the teeth are not exposed as the inner portion of the belt as in conventional belts, but are now enclosed by a spongy layer of rubber which remains as a permanent part of this belt. As shown in FIGURE 5, this belt body is cut at the necessary angle in order to provide a plurality of individual belts 20 as illustrated in FIGURE 6.

A variation of the above belt is illustrated in FIGURE 7 in which a belt 24 is fabricated in a manner very similar to that just described. In this variation, however, the prefabrication of compression section 11 is followed by placing a layer of fabric 21 against the grooved and toothed face of the section 11, followed by placing the section 17 against this fabric layer in a manner similar to that previously described. The fabric layer 21 is thus located between the compression section 11 and the blow stock section 17 and is secured by applying solvent to all mating faces in order to cause adhesion thereof. The fabric layer 21 is similar to the layer 19 previously described. The components are assembled as shown in FIGURES 2 and 3 and cured with the blowing step taking place as described previously. The resultant product is shown in FIGURE 7 in which the same sponge rubber section 17a is located inwardly of the teeth and grooves of the compression section 11, but in this case the fabric layer 21 provides an additional member for extra strength, abrasion resistance, and flexibility.

FIGURE 8 illustrates still another form of the invention in which a finished belt 25 may be fabricated with a complete fabric cover 22 around the entire belt. This form of the invention is fabricated by eliminating the inner fabric layer 19 and the outer fabric layer 18 during the initial construction so that the belt body after fabrication will consist solely of the tension section 15, strength cords 16, compression section 11, and the blown sponge section 17a. This belt body is cut in a trapezoidal cross section as shown in FIGURE 5 and then the resultant individual belts are wrapped with a fabric 22 in a conventional manner known in the belt art. This procedure is no more complex than the wrapping of a conventional trapezoidal belt, yet because of this invention it is possible for the first time to provide a toothed belt which may be simply and easily wrapped with a single cover. Such a belt will have advantages in certain types of belt drives. It is obvious that this outer cover may be wrapped around the basic form of the belt shown in FIGURES 1–6, or around the modified form shown in FIGURE 7.

As used in this application, the term "rubber" means natural rubber or synthetic rubber such as butadiene-styrene copolymers, butadiene-acrylonitrile copolymers, polychloroprene, or the like.

Other variations in construction are possible and are specifically contemplated within the spirit of the invention.

I claim:

1. An endless V-type transmission belt having a tension section and a compression section, said compression section comprising transverse teeth and a blown rubber section located inwardly of and between said teeth.

2. The belt of claim 1 including a fabric cover on the outer and inner surfaces of the belt.

3. The belt of claim 1 including a fabric cover around the entire belt.

4. An endless V-type transmission belt having a tension section and a compression section, said compression section comprising transverse teeth, a layer of fabric over said teeth, and a blown rubber section located inwardly of said fabric.

5. The belt of claim 4 including a fabric cover around the entire belt.

References Cited
UNITED STATES PATENTS

| | | | |
|---|---|---|---|
| 2,062,568 | 12/1936 | Freelander | 74—233 |
| 3,164,026 | 1/1965 | Terhune | 74—233 |

FRED C. MATTERN, Jr., *Primary Examiner.*

J. A. WONG, *Assistant Examiner.*